United States Patent [19]

Ramsey, III

[11] 3,890,842

[45] June 24, 1975

[54] DISPOSABLE MANOMETER

[75] Inventor: Maynard Ramsey, III, Durham, N.C.

[73] Assignee: Ramtech, Inc., Tampa, Fla.

[22] Filed: Apr. 23, 1974

[21] Appl. No.: 463,393

[52] U.S. Cl. ............... 73/420; 73/409; 128/2.05 D; 141/383
[51] Int. Cl. ............................................. G01l 7/00
[58] Field of Search ..................... 73/409, 420, 410; 128/2.05 D, 2.05 E; 92/91, 92; 138/30; 141/312, 383

[56] References Cited
UNITED STATES PATENTS
3,648,687  3/1972  Ramsey................................ 73/409

*Primary Examiner*—Donald O. Woodiel
*Attorney, Agent, or Firm*—Gipple & Hale

[57] ABSTRACT

A disposable pressure monitoring device comprising a tube which is separated by a flexible finger shaped diaphragm into first and second chambers. One end of the tube is provided with a fluid filling assembly which keeps the diaphragm in a recessed position, with the other end of the tube being attached to a pressure sensing device. The pressure sensing device is of any standard reusable type and it does not require sterilization.

10 Claims, 8 Drawing Figures

PATENTED JUN 24 1975 3,890,842

SHEET 1

DISPOSABLE MANOMETER

BACKGROUND OF THE INVENTION

The invention generally relates to pressure indicating devices of the type used for the measurement of body fluid pressures and more particularly to a direct reading, disposable manometer adapted for use in the measurement of arterial, venous blood and cerebrospinal fluid perssures.

FIELD OF INVENTION

The pressures of fluids in the vessels of all living things are indications of many facts which are of great value to those engaged in medical, biological and related fields. In the case of humans, the pressure in the vascular system is measured for many reasons, including diagnosis of pathology, laboratory routine for certain ailments, ascertainment of the progress of therapy, etc. As an example, the determination of venous blood pressure is an essential element in the diagnosis of a patient suspected of cardiac disease. Normal human venous blood pressure ranges between 80-120 millimeters water, whereas elevations of venous blood pressure above that range are found in cases of congestive heart failure.

Similarly, cerebrospinal fluid pressure normally ranges between 70-180 millimeters water, with elevated pressures being found, for example, in cases of intracranial tumor, supperative encephalitis, and cerebral abscess, hydatid cysts, extra, subdural, subarachnoid and intra cerebral hemorrhage, meningitis, acute encephalitis, hydrocephalus, craniostenosis, cerebral edema following head injury, acute nephritis, hypertensive encephalopathy and eclampsia. Lower than normal cerebrospinal pressures may be observed in such cases as spinal block by tumor, some subdural hematomas, and intracranial space occupying lesions which produce displacement of normal structures to cause pressure coning at the foramen magnum or tentorial opening.

The most common method of obtaining arterial blood pressure has been to gradually apply constrictive pressure about the limb of the patient until the flow of blood through a vessel has been arrested, as determined by listening to a stethoscope applied over the vessel at a point distal the point of constriction. Then, upon gradual release of the constricted pressure, the beginning of the flow through the vessel can be heard and the constricted pressure is noted on a gauge reading in millimeters of mercury. This pressure is referred to as systolic pressure. The pressure is then further gradually released until the sounds of the flow again cease and the pressure is again noted, which pressure is referred to as diastolic pressure. The difference between the diastolic pressure and systolic pressure is termed pulse pressure. Previous constriction pressure has been derived from an inflatable cup connected to a mercury column manometer or to an aneroid type gauge having a dial scale calibrated in millimeters of mercury. While this common device is satisfactory for measuring the diastolic-systolic pressure range for a discreet period of time, it has the obvious disadvantage of not being able to continuously monitor the patient's blood pressure.

DESCRIPTION OF THE PRIOR ART

In the prior art, many attempts have been made to devise blood pressure gauges which are portable, inexpensive and yet provide the attending physician with an accurate determination of the patient's blood pressure. One such device employs telescopically related, spring loaded tubes, the tubes being biased in an extended position. By exerting axial pressure on the tubes against an artery until blood flow in that artery is cut off, and by monitoring the relative displacement of the tubes from the fully extended position required to produce such flow cut off, the systolic pressure is monitored. However, the means for monitoring the displacement of the tubes is often inconvenient or clumsy.

Another prior art device employs a pointer extending from an inner tube through a longitudinal slot in an outer tube, the outer tube having calibrated markings adjacent the slot. The disadvantage with this arrangement lies in the fact that the tubes, and hence the pointer, return to the original biased position upon removal of the instrument from the body, thereby requiring the operator to take a reading while exerting direct pressure. Such a technique has been found to be inconvenient.

Generally speaking however, the indirect methods of making fluid pressure measurements, such as the ones described above, are not as accurate as any method which utilizes the particular fluid itself operating directly against a pressure sensing device.

Some direct intra-arterial pressure monitoring devices have been developed. One such device is shown in Surgery, Vol. 61, 1967, May, pp. 711–712, while another device is shown in Anesthesiology, November–December 1957, pp. 906–907.

In certain disposable manometers, such as those disclosed in U.S. Pat. Nos. 3,648,687 and 3,720,201, the lower plenum of the manometer tube as defined by a tube body and diaphragm is filled with a non-compressible liquid which aids in the transmission of undampened pressure variation. However, when the lower plenum is filled with liquid, two basic problems occur. The first problem is that a syringe must be used to fill the disposable manometer plenum with liquid with the result that when the needle is inserted into the manometer the diaphragm may be ruptured. In addition to the possibility of rupturing of the diaphragm, spillage often occurs and the actual filling process itself is somewhat difficult requiring the expenditure of time and necessitating filling of the manometer by personnel familiar with the use of hypodermic syringes. Before the manometer has been filled with liquid, another problem occurs when the gauge is inserted into the distal end of the manometer, prior to filling. The insertion of the gauge into the manometer causes the diaphram to be fully extended and to generate factitious pressure increase. It has also been found that when the diaphragm is in this extended position, it is extremely susceptible to temperature and pressure changes outside of the system being measured. For example, it has been noted that when there is a temperature increase outside the system, the increased temperature can be transferred into the manometer resulting in a pressure reading which is higher than that reading which would normally be obtained when taking the patient's blood pressure. Testing has shown however, that if the diaphragm is indented and maintained with an intended shape when the gauge is inserted in the manometer, that outside temperature and pressure variants no longer influence the accuracy and that a truer reading of the patient's blood pressure can be obtained. Consequently, the present novel filling assembly solves both the aforementioned problems in that it allows the manometer to be easily filled without diaphragm rupture in a minimum of time and with a reduction of spillage while also holding the diaphragm in an indented position while the gauge is being inserted in the manometer. The novel filling and retaining assembly of the manometer having been previously mounted to the male luer connector during assembly of the device, is removed from the catheter connector of the manometer after the device is filled with saline, and a catheter or hypodermic needle is mounted on the connector to obtain the blood pressure reading desired.

The present invention provides a disposable blood pressure manometer specifically adapted to be easily filled with fluid through a hollow needle which retains its diaphragm in a predisposed, partially collapsed position during the insertion of the gauge. The manometer provides a direct reading, when used in conjunction with a standard aneroid gauge or other sensing device. In addition, the manometer is portable and specifically adapted for carrying in a doctor's valise, thus providing a useful diagnostic instrument.

A further object of the invention is to provide an apparatus for the measurement of fluid pressures in humans and animals which can be safely, quickly and easily be filled with fluid solution by laboratory technicians without any particular skill other than that provided by conventional training.

The presently designed manometer is so simple and inexpensive in construction that it may be discarded after use instead of being washed and resterilized, with the only sterilization being required being at the place of manufacture where sterilization and adequate testing to assure sterility can be effected in mass production at little cost. Because of its simple construction, it can be filled with liquid and used safely, quickly, and easily, in any physical environment.

SUMMARY OF THE INVENTION

The present invention comprises a tube or barrel with a flexible diaphragm which divides the tube into an upper and lower plena. The lower plenum is filled through the use of a novel disposable filling assembly which is attached to the barrel for filling purpose and projects into the interior of the tube depressing the flexible diaphragm, so that a suitable imcompressible fluid can be placed in the lower plenum of the tube for improved sensitivity to pressure differentials. The upper plenum is adapted to receive a pressure sensing or recording instrument such as a standard aneroid gauge with the flexible diaphragm remaining in a depressed position after the gauge has been inserted into the tube.

The complete device including the filling attachment is designed to be sterilized and packaged at the point of manufacture and thrown away after one use.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

Similar reference characters refer to similar parts throughout the several views of the drawings.

DETAILED DESCRIPTION OF THE PREFERRED EMBODIMENTS

Figure 1:
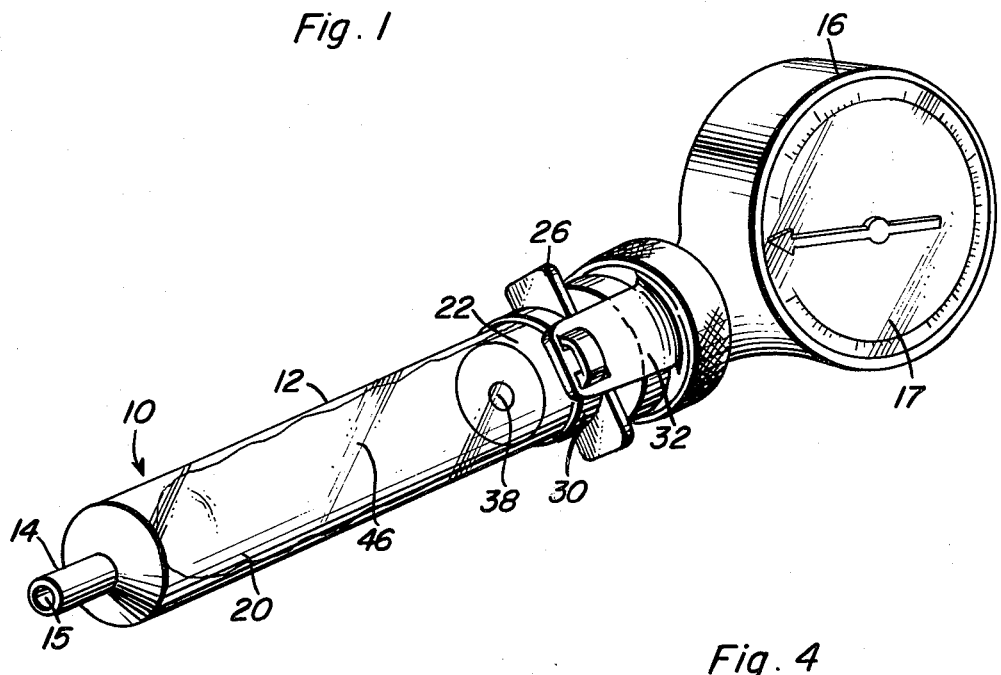
FIG. 1 is a perspective view of the prior art.

Referring now to the drawings, the filling assembly of the disposable manometer of the present invention is shown and generally referred to by the reference number 50.

Manometer 10 comprises a tube or barrel 12 having at one end a catheter or hypodermic needle connector 14 and at the distal end a tube orifice adapted to receive a stopper 22 and a standard aneroid gauge 16 or other standard pressure sensing or recording device. Inserted within tube 12 is a flexible diaphragm 20 having a sac-like configuration which is placed in an airtight seal when a resilient stopper 22 is fitted into tube orifice. If desired, the tube and diaphragm can be integrally formed as is disclosed in my co-pending United States Patent Application Ser. No. 338,283 filed Mar. 5, 1973. Surrounding tube orifice are optional radially extending finger flanges 26 which are integral with tube 12 and may be used to aid in the insertion and removal of the nipple of a standard aneroid gauge 16 or other pressure sensing or recording device being used to sense the transmitted pressures. While flanges 26 are used to help insertion and removal of the gauge nipple, their primary function is to act as a stop to prevent retaining band 30 and associated end cover 32 or a suitable heat-shrink end cover material from slipping off the end of tube 12.

Any number of different end covers can be used in the invention such as the previously mentioned heat-shrink material or other retaining covers similar to the ones disclosed in my co-pending United States Patent Application Ser. No. 338,283 filed Mar. 5, 1973. Any of the above indicated arrangements insures that an airtight seal will remain between stopper 22 and the tube orifice.

Figure 2:
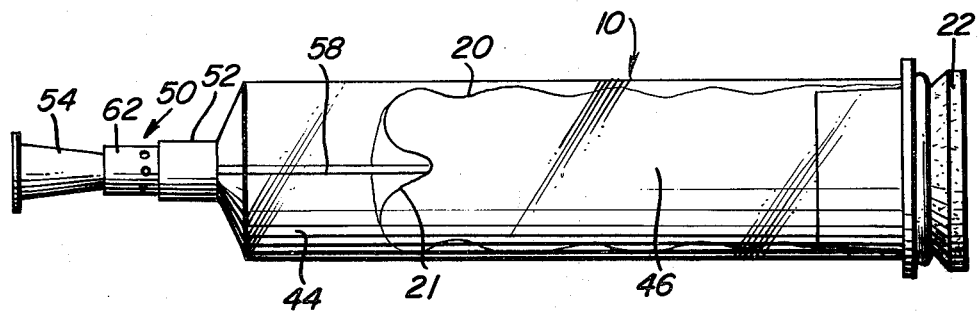
FIG. 2 is a side elevational view of the inventive manometer.

A filling and retaining assembly 50 is removably secured to the catheter connector 14 of tube 12 as is shown in FIG. 2. The filling and retaining assembly 50 optionally includes a protective sleeve 52 mounted to the tube around the catheter connector 14. The protective sleeve 52 is preferably composed of metal with thread forming screw threads on the inside so that it can screw threaded to the tube surface. However, the sleeve 52 can be integrally be formed with the tube or secured to the tube by adhesives or heat sealing means. If the sleeve is integrally formed with the tube it would have the same composition as the tube namely plastic.

It is apparent, however, that any suitable material can be used for the sleeve 52.

Figure 4:
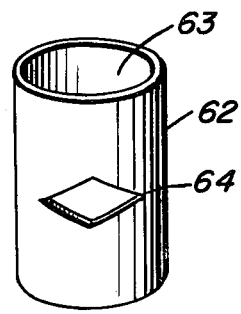
FIG. 4 shows a perspective view of one sleeve component used with the filling assembly.
Figure 8:
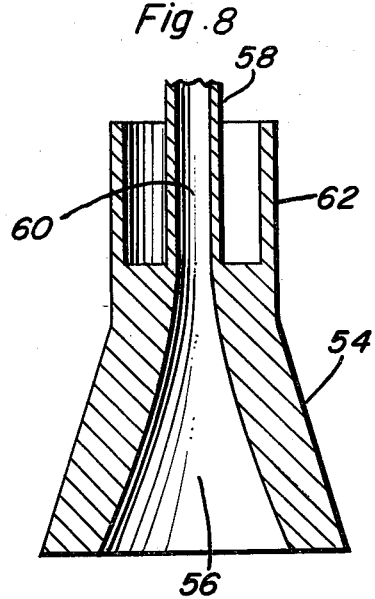
FIG. 8 discloses an enlarged cross-sectional view of another filling assembly with the needle portion broken away.
Figure 5:
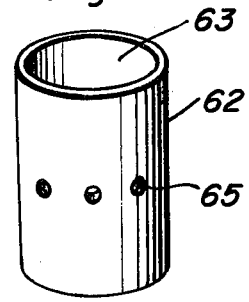
FIG. 5 shows a perspective view of another sleeve component used with the filling assembly.

The filling assembly itself comprises a receptacle member 54, having a tapered bore 56 and a tube or hollow needle 58, secured to receptacle member 54 so that the receptacle bore 56 communicates with a bore 60 of the needle tube 58 allowing liquid placed into the receptacle or liquid carried by a hypodermic and inserted into the receptacle to flow through the needle bore 60 into the lower plenum 44 of tube 12. The needle tube 58 is of a smaller diameter than the interior diameter of the catheter connector 14 allowing it to be inserted through the catheter connector bore 15 into the interior of the tube 12 so that one end on the needle contacts and depresses one end of a flexible finger-shaped diaphragm 20 positioned in the tube forming a recess or depression 21 in the diaphragm 20. The needle tube 58 does not snuggly fit into bore 15 of the catheter connector 14. Since the outer diameter of the needle tube is less than the diameter of bore 15 an annular passage is formed by the inner wall of connector 14 and the outer wall of the needle tube 58 allowing fluid from the interior of the tube 12 to escape through the annular passage into the atmosphere. In the preferred embodiment, the assembly 50 is held in place on the tube 12 by a connector sleeve member 62 having a through going bore 63. The connector sleeve member 62 fits over at least a portion of the receptacle member 54 and over the catheter connector 14 to hold the assembly in a fixed position with regard to the catheter connector 14. The connector sleeve is preferably composed of a resilient material such as plastic which is adapted to expand and still retain holding power. The connector sleeve member 62 fits snuggly over the end of the catheter connector 14, and the end of the receptable member 54 to hold them together in a removable but relatively fixed position. The connector sleeve 62 can optionally have a large discharge port 64 such as is shown in FIG. 4 or a plurality of smaller discharge ports 65 as is shown in FIG. 5.

Figure 3:
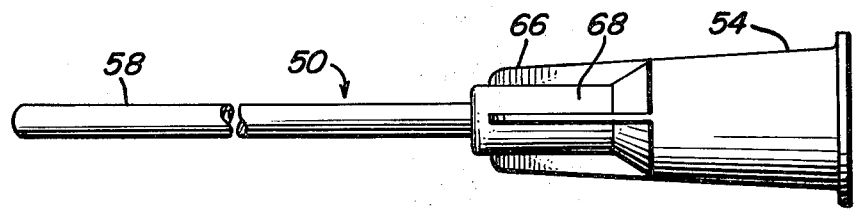
FIG. 3 is a perspective view of a filling assembly of the invention.

These discharge ports allow fluids such as air which is displaced from the lower plenum 44 when the lower plenum is filled with liquid, to escape into the atmosphere. The receptacle member 54, if desired, can be provided with a plurality of integral outwardly extending ribs 66 as shown in FIG. 3 which fit snuggly against the wall of the connector sleeve 62 allowing fluid to escape along channels 66 formed by the ribs into the atmosphere.

Figure 7:
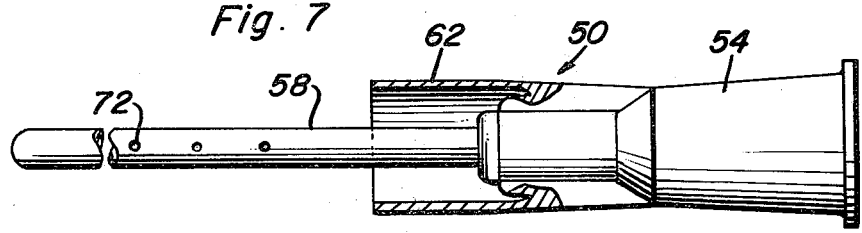
FIG. 7 shows another enlarged view partially in cross-section of another needle and filling assembly.

An integral construction combining both the connecting sleeve 62 and the base receptacle member 54 is shown in FIG. 7. As was previously mentioned, the connector sleeve 62 can be provided with one or more discharge ports. The receptacle member 54 is provided with a tapered bore 56 which communicates with the tube bore 60. The tapered bore 56 allows a syringe to be easily placed into the bore so that the syringe will discharge liquid into the needle tube 58 to fill the lower plenum 44. The needle tube 58 is designed with a blunt end which engages the flexible finger-like or sac-like diaphragm 20 and depresses it inward to form a recess 21. This recess is formed without rupturing the diaphragm. Two needle tube constructions are utilized in the invention so that the needle tube 58 is able to discharge liquid into the lower plenum 44 without being sealed off when it engages the diaphragm.

Figure 6:
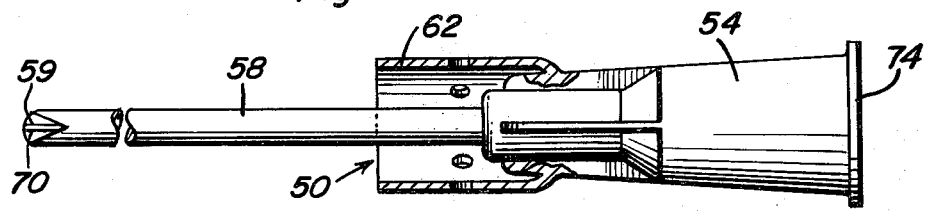
FIG. 6 shows an enlarged view partially in cross-section of a needle used with a filling assembly.

In the first construction, which is shown in FIG. 6, the hollow needle tube 58 with its blunt end 59 is ground off on an incline to form a beveled end 70. When the blunt end 59 contacts the diaphragm 20, it is not sealed off and liquid can still pour into the lower plenum 44 from the inclined beveled end 70 of the needle tube. The second tube construction is shown in FIG. 7 in which a plurality of bores 72 are cut through the wall of the needle tube into the bore 60 allowing the bore 60 of the needle tube to communicate with the space surrounding the wall of the tube so that liquid transmitted through the bore of the needle tube pours out bores 72 into the lower plenum 44 of the tubular structure 12 filling up the lower plenum 44 and forcing the residual diaphragm fluid out through suitable escape ports.

Before the lower plenum 44 has been filled with liquid, the nipple of an aneroid gauge 16 is inserted into a hole in the stopper. The force of the gauge 16 being inserted into the stopper extends the flexible diaphragm 20 against the needle tube 58. Even though the flexible diaphragm is extended it retains the recess 21 formed by contact with the needle tube 58. After filling, assembly 50 is then removed from the catheter connector 14 and a catheter or hypodermic syringe is attached to the catheter connector 14 by a tube or other means not shown. The assembly 50 is provided with an integral finger flange 74 on the distal end of the receptacle member 54 so that it can be readily grasped by the user and the assembly easily removed from the catheter connector 14. The diaphragm 20 retains its indented form or recess 21 after the filling assembly has been removed so that temperature or pressure changes on the outside of the manometer will not affect the blood pressure reading which is being taken from the patient. Thus, the indented configuration of the finger-like diaphragm simplifies the achievement of accurate blood pressure readings compared to presently existing manometers.

An end cover 32 is provided over the stopper 22 to keep the stopper firmly positioned in the tube. The end cover 32 can have a secondary function which insures that the disposable manometer 10 is not accidentally used a second time. The end cover 32 may be made of thin plastic or any similar substance which has sufficient tensile strength to allow it to be used as the retaining means for stopper 22 while at the same time having a relatively low resistance against rupture to the penetrating, transverse force of the gauge nipple when the nipple is forced into hole 38 of stopper 22. In the alternative, a hole of smaller diameter than stopper hole 38 may be provided in the end cover 32 and this hole registered over the stopper hole 38 to act as a starter in the insertion of nipple 28.

Initially, the various elements of the device, excluding gauge 16, are assembled, individually packaged, and sterilized at the place of manufacture. The component parts are made of inexpensive material such as plastic and the like and the device is designed to be disposed of after one use. At the point of use, the package is opened and the device removed. The manometer 10 may have a standard catheter and hypodermic syringe (not shown) included with the package or the catheter and syringe may be used from available supplies.

The upper plenum 46 can optionally be filled with a non-corrosive, non-compressible liquid, at the point of manufacture or at the time of use which will aid in the transmission of undampened pressure variations.

In operation, the manometer 10 is removed from its sterilized container, the gauge is inserted, and the user fills the lower plenum 44 with a saline solution by inserting a syringe into the filling assembly 50 and emptying the contents of the syringe into needle tube 58 which empties into the lower plenum. As the liquid flows into the lower plenum, the fluid originally contained in the lower plenum 44 is displaced through the annular space formed between the inner wall of the connector 14 and the outer wall of needle tube 58 into the connector sleeve 62 where it passes out through at least one bore in the sleeve wall into the atmosphere.

The filling assembly 50 is then removed, the tube connection leaving the diaphragm 20 in an indented state and a catheter or hypodermic syringe is secured on the catheter connection 14.

When determining venous pressure, a tourniquet is applied to the upper arm of the patient and vein puncture with a hypodermic needle (not shown) is performed in the usual fashion. The tourniquet is thereupon released, allowing an equilibration of pressure. At this time, diaphragm 20 will transmit the pressure variations to the indicating fluid in upper plenum 48 which consequently causes registration on the gauge dial 17. After the arterial or venous pressure has been monitored, the hypodermic needle (not shown) is removed from the vein and manometer gauge 16 removed from stopper 22. The disposable manometer tube 12 is then discarded.

When measuring cerebrospinal fluid pressure, the device is assembled in the same way as before. Spinal puncture is performed in a well known manner, e.g., by lying the patient on his side with his knees flexed. The area to be pierced, usually the third of fourth lumbar interspace, is prepared by sterile cleansing, then infiltrated with one percent procaine and then the hypodermic needle (not shown) is inserted into the area. Penetration into the spinal canal may be felt by the giving way of the spinal ligaments. If the needle is properly located, there will be a visual indication of the cerebrospinal fluid therein.

Insofar as the specific dimensions of the disposable manometer invention 10 are concerned, it is within the contemplation of this invention that tube 12 and associated components could have any suitable cross-section such as rectangular, triangular, oval, etc. Further, it is contemplated that catheter connector 14 can be located eccentrically with tube 12 or even transversely located on the side wall of tube 12.

Furthermore, diaphragm 20 could be molded into tube 12 at any location along its length or, it could be attached to catheter connector 14 or any other suitable location to isolate lower and upper plena 44 and 48.

The various elements of the disposable manometer 10 may be made of any suitably lightweight substance such as plastic which will facilitate easy handling and use.

It will thus be seen that the objects set forth above and those made apparent from the preceding detailed description are efficiently attained and since certain changes may be made in the above construction without departing from the scope of the invention, it is intended that all matter contained in the above-detailed description or shown in the accompanying drawings, shall be interpreted as illustrative and not as a limitation.

What is claimed is:

1. A disposable blood pressure monitor comprising an elongated tubular structure, means on one end of said tubular structure adapted to place the interior of said tubular structure in direct communication with a fluid system to be monitored, a flexible membrane received within said tubular structure, said flexible membrane separating said tubular structure into first and second chambers, stopper means engaging the other end of said tubular structure and filling means removably mounted on said means of said tubular structure adapted to place the interior of said tubular structure in direct communication with a fluid system to be monitored, said filling means comprising a hollow receptacle member, tube means secured to said hollow receptacle member and communicating with said hollow receptacle member, said tube means extending into said tubular structure and engaging said flexible membrane to depress said flexible sac-like membrane within said tubular structure.

2. A disposable blood pressure monitor as claimed in claim 1 wherein said filling means comprises a receptacle member defining a tapered bore, a tube member defining a bore secured to said receptacle member and communicating with said receptacle member tapered bore.

3. A disposable blood pressure monitor as claimed in claim 2 wherein said tube member has a blunt end and defines a plurality of holes in its wall to allow said tube member bore to communicate outside of said tube wall.

4. A disposable blood pressure monitor as claimed in claim 2 wherein said tubular member has a blunt beveled end exposing an inclined section of said bore.

5. A disposable blood pressure monitor as claimed in claim 2 wherein said receptacle member defines a plurality of external ribs, each of said ribs defining channels therebetween.

6. A disposable blood pressure monitor as claimed in claim 1 wherein said receptacle member defines a flange on one end, said flange extending substantially transversely from said receptacle member.

7. A disposable blood pressure monitor as claimed in claim 1 wherein said tube means is a hollow needle.

8. A disposable blood pressure monitor using a gauge comprising an elongated tubular structure, connector means formed on one end of said tubular structure adapted to place the interior of said tubular structure in communication with a fluid system to be monitored, a flexible sac-like membrane positioned within said tubular structure to separate said tubular structure into first and second chambers and stopper means sealing the other end of said tubular structure, said stopper means being adapted to receive said gauge, a filling and retaining means removably mounted to said connector means, said filling and retaining means comprising a connector sleeve member removably mounted to said connector means, a receptacle member defining a bore mounted to said connector sleeve, tube means secured to said receptacle member and extending through said connector means into the interior of said tubular structure to engage and indent said flexible sac-like membrane, said tube means communicating with said receptacle member and defining discharge means to allow liquid to be discharged in one of said chambers, said sleeve connector member defining at least one discharge port allowing fluid contained in said one of said chambers to pass therethrough when liquid is discharged into said one of said chambers.

9. A disposable blood pressure monitor comprising an elongated tubular structure having a conical end with a tubular projection adapted to place the interior of said tubular structure in communication with a fluid system to be monitored and an open other end, a flexible membrane mounted within said tubular structure to separate said tubular structure into first and second chambers, a stopper member mounted in said other end of said tubular member, gauge means mounted in said stopper member and filling and retaining means mounted to said tubular projection, said filling and retaining means comprising a connector sleeve mounted on said tubular projection, said connector sleeve defining at least one discharge port, a hollow receptacle member defining a tapered bore connected to said connector sleeve, a hollow needle member secured to said hollow receptacle member, the bore of said hollow needle member communicating with the tapered bore of said receptable member, and the interior of said tubular structure, said needle member having an outside diameter less than the inside diameter of said tubular projection to form an annular space between the two diameters, said needle member being of suitable length to extend into the interior of said tubular structure to engage and indent said flexible membrane, and defining a blunt end and fluid discharge means.

10. A disposable blood pressure monitor comprising an elongated tubular structure, connector means formed on one end of said tubular structure adapted to place the interior of said tubular structure in communication with a fluid system to be monitored, a flexible member connected to and received within said tubular structure, said flexible member separating said tubular structure into first and second chambers, stopper means positioned in the other end of said tubular structure, said stopper means being adapted to receive gauge means, filling means removably mounted to said connector means, said filling means comprising a receiving member defining a throughgoing bore and hollow tubular means secured to said receiving member and communicating with said receiving member throughgoing bore, said tubular means extending into said tubular structure and adapted to transport liquid into said tubular structure and discharge means associated with said connector means to allow fluid to be discharged from said tubular structure when liquid is transported into said tubular structure.

* * * * *